(12) United States Patent
Kouno

(10) Patent No.: US 7,959,511 B2
(45) Date of Patent: Jun. 14, 2011

(54) INFORMATION PROCESSING DEVICE FOR CONTROLLING MOVEMENT OF A GAME CHARACTER BY USING A PLAYER IMAGE AND GAME CHARACTER MOVEMENT CONTROL METHOD

(75) Inventor: Tsutomu Kouno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 214 days.

(21) Appl. No.: 11/630,749

(22) PCT Filed: Jun. 28, 2005

(86) PCT No.: PCT/JP2005/011778
§ 371 (c)(1),
(2), (4) Date: Dec. 21, 2006

(87) PCT Pub. No.: WO2006/003870
PCT Pub. Date: Jan. 12, 2006

(65) Prior Publication Data
US 2008/0058100 A1 Mar. 6, 2008

(30) Foreign Application Priority Data
Jun. 30, 2004 (JP) ................................. 2004-194814

(51) Int. Cl.
*G06F 17/00* (2006.01)
(52) U.S. Cl. ........................................................ 463/31
(58) Field of Classification Search ............... 463/31–34
See application file for complete search history.

(56) References Cited

U.S. PATENT DOCUMENTS

| 5,506,949 | A | * | 4/1996 | Perrin | 345/473 |
| 5,623,428 | A | * | 4/1997 | Kunii et al. | 703/6 |
| 5,982,389 | A | * | 11/1999 | Guenter et al. | 345/474 |
| 5,986,675 | A | * | 11/1999 | Anderson et al. | 345/473 |
| 6,184,899 | B1 | * | 2/2001 | Akemann | 345/473 |
| 2002/0151337 | A1 | | 10/2002 | Yamashita et al. | |
| 2005/0221879 | A1 | * | 10/2005 | Tsuchiya | 463/8 |

FOREIGN PATENT DOCUMENTS

| JP | 2001-273503 A | 10/2001 |
| JP | 2001-307124 A | 11/2001 |
| JP | 2002-149302 A | 5/2002 |
| JP | 2002-196855 | 7/2002 |
| JP | 2002-292123 A | 10/2002 |
| WO | WO 99/34276 A2 | 7/1999 |

OTHER PUBLICATIONS

International Search Report dated Sep. 13, 2005.
Jun Kubodera, "Action Interface niyoru Game Seisaku", The Institute of Electronics, Information and Communication Engineers Gijutsu Kenkyu Hokoku, vol. 97, No. 85, Jun. 3, 1997, pp. 99 to 104.

* cited by examiner

*Primary Examiner* — Ronald Laneau
(74) *Attorney, Agent, or Firm* — Katten Muchin Rosenman LLP

(57) ABSTRACT

An information processing system includes: area extraction means for extracting an area occupied by a player from the mirror moving picture containing a player; control means for generating a computer image containing a game character; and display control means for causing a display device to display a superimposed moving picture obtained by superimposing the mirror moving picture and the computer image. The control means moves the game character according to the area occupied by the player in the superimposed moving picture. Thus, in the information processing system using the player image acquired by a camera as the input interface, it is possible to improve the game entertainment.

15 Claims, 8 Drawing Sheets

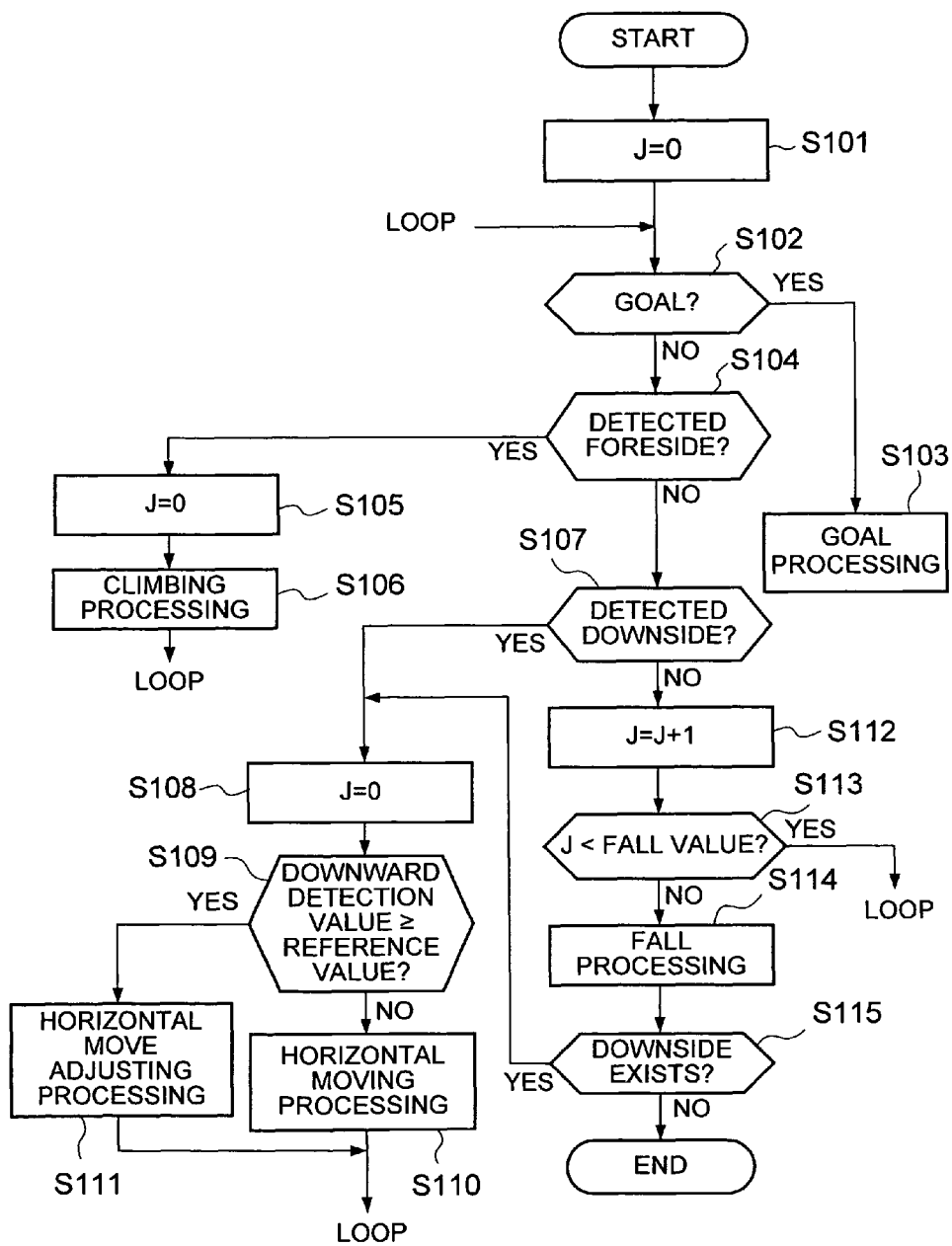

INFORMATION PROCESSING DEVICE FOR CONTROLLING MOVEMENT OF A GAME CHARACTER BY USING A PLAYER IMAGE AND GAME CHARACTER MOVEMENT CONTROL METHOD

This application is a National Phase Application of International Application No. PCT/JP2005/011778, filed Jun. 28, 2005, which claims the benefit under 35 U.S.C. 119(a-e) of JP 2004-194814 filed Jun. 30, 2004, which is herein incorporated by reference.

TECHNICAL FIELD

The present invention relates to an information processing system that allows a game scenario to proceed, by using a player image that is taken by a camera.

BACKGROUND ART

An information processing system has been proposed that uses a player image taken by a camera, as an input interface to enter a command and the like.

For example, Patent Document 1 discloses an image processor that generates a combined moving image obtained by combining a mirrored moving image of a player and a computer image such as a menu image, and a hand of the player displayed on the image is assumed as a pointing device to accept a directive such as menu selection.

Patent Document 1: Japanese Patent Laid-Open Publication No. 2002-196855

SUMMARY OF THE INVENTION

Problems to be Solved by the Invention

Motion of a player and an operation for the image processor are directly related, in the input interface disclosed by the Patent Document 1, thereby showing a universally accepted operability. Therefore, this technique is, in particular, expected to be applied in entertainment system fields, targeting a wide range of users at all ages. On the other hand, in applying such a technique in the entertainment system, design ideas to further improve the game quality are required.

An object of the present invention is to provide a technique to further improve game quality in information processing systems that use a player image taken by a camera, as an input interface.

Means for Solving the Problems

An information processing system according to a first aspect of the present invention to address the above subject, includes an area extraction means that extracts an area occupied by a player, from a mirrored moving image containing the player, a control means that generates a computer image containing a game character, and a display control means that allows a display device to display a superimposed moving image obtained by superimposing the mirrored moving image and the computer image, wherein, the control means moves the game character along the area occupied by the player in the superimposed moving image.

The information processing system may further include a player moving image accepting means that accepts an input of a player moving image obtained by taking images of the player by an image pickup device, and a mirrored moving image processing means that subjects the player moving image to mirroring.

Here, the area extraction means is capable of extracting an area occupied by the player, on the basis of a difference between an image not containing the player, previously obtained, and the player moving image.

At this time, it is desirable that the display control means allows the display device to display an image prompting the player to get out of an image frame of the image pickup device, so as to obtain an image that does not contain the player.

The control means allows the game character to appear from one or multiple starting points provided on one side of a screen, and to move the game character toward one or multiple goals provided on another side of the screen, thereby further improving the game quality.

In addition, the control means determines whether or not an area occupied by the player exists in front of the game character in the moving direction thereof and below the game character. When there is no existence of an area occupied by the player below the game character, the game character is made to fall, and when an area occupied by the player exists in front of the game character, the game character is made to move obliquely upward in the moving direction of the game character.

A game character movement control method according to a second aspect of the present invention to address the above subject is a game character movement control method in an information processing device connected to an image pickup device and a display device, including an area extraction process that extracts an area occupied by a player from a mirrored moving image based on a moving image containing the player taken by the image pickup device, a control process that generates a computer image containing a game character, and a movement control process that allows the display device to display a superimposed moving image obtained by superimposing the mirrored moving image and the computer image, and moves the game character regarding an area occupied by the player in the superimposed moving image as a route.

BRIEF DESCRIPTION OF DRAWINGS

FIG. 8 is a flow diagram showing movement control of the character;

DESCRIPTION OF REFERENCE NUMERALS

1 VIDEO CAMERA
2 ENTERTAINMENT APPARATUS
3 DISPLAY DEVICE
101 VIDEO IMAGE INPUT SECTION
102 IMAGE INVERTING SECTION
103 AREA EXTRACTING SECTION
104 MAIN CONTROLLER
105 CG GENERATOR
106 SUPERIMPOSED IMAGE GENERATOR
107 DISPLAY CONTROLLER

PREFERRED EMBODIMENTS OF THE INVENTION

Hereinafter, an exemplary embodiment of the present invention will be explained.

Figure 1:
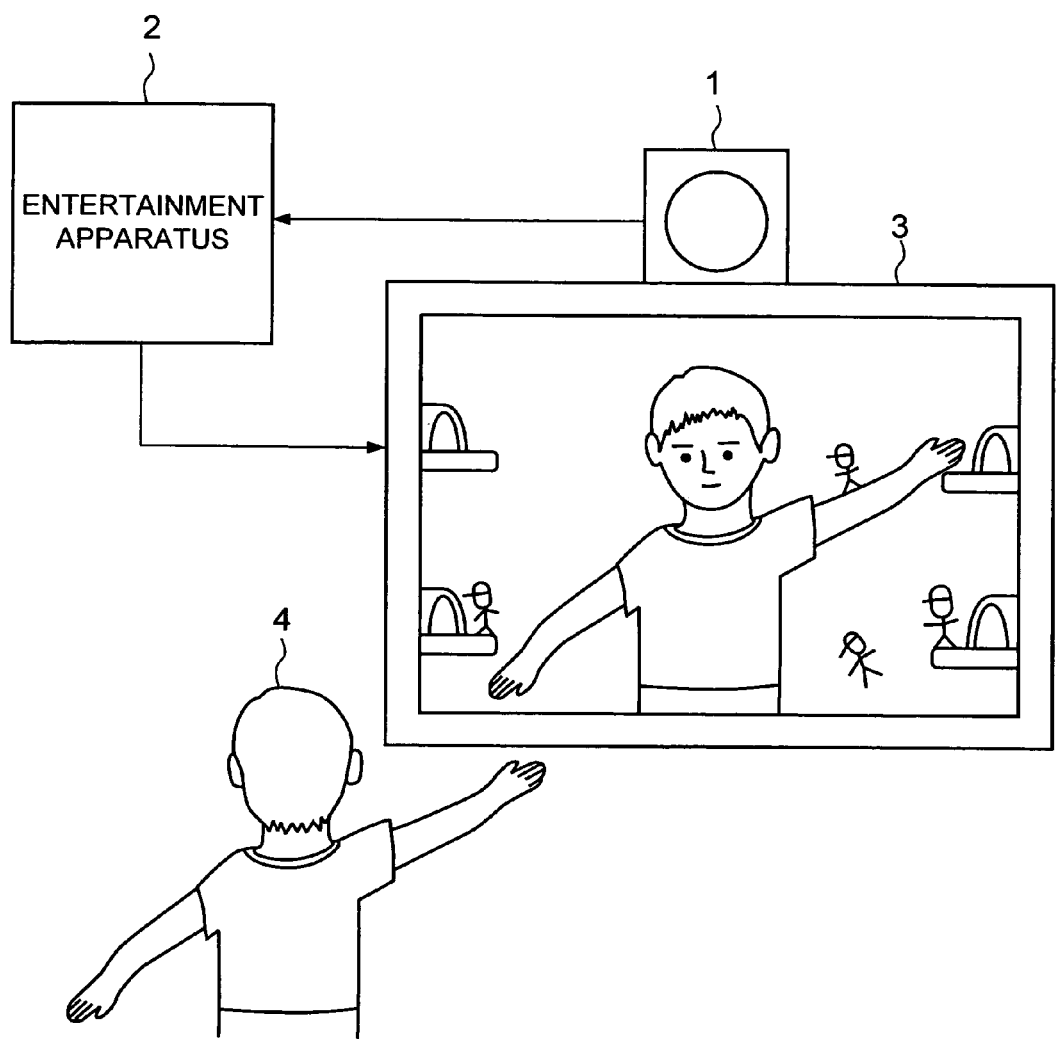
FIG. 1 illustrates an overall configuration of an entertainment system relating to one embodiment of the present invention.

FIG. 1 shows an example of a configuration of an entertainment system relating to the present embodiment. This entertainment system takes an image of player 4 who is at a position facing a display device 3, by using an analogue or digital video camera 1. Entertainment apparatus 2 continuously captures the obtained moving image, and the computer image (CG) generated by the entertainment apparatus 2 and a mirrored moving image of the moving image captured from the video camera 1 are superimposed, to be displayed in real time on the display device 3. Therefore, a motion of the player 4 is reflected on the superimposed image in real time, and the player can enjoy playing with this superimposed image. The entertainment apparatus 2 can generate the mirrored moving image by mirroring the moving image captured from the video camera 1 (right-left inversion of the image), but another method may also be available. For example, the mirroring may be performed on the video camera 1.

Figure 2:
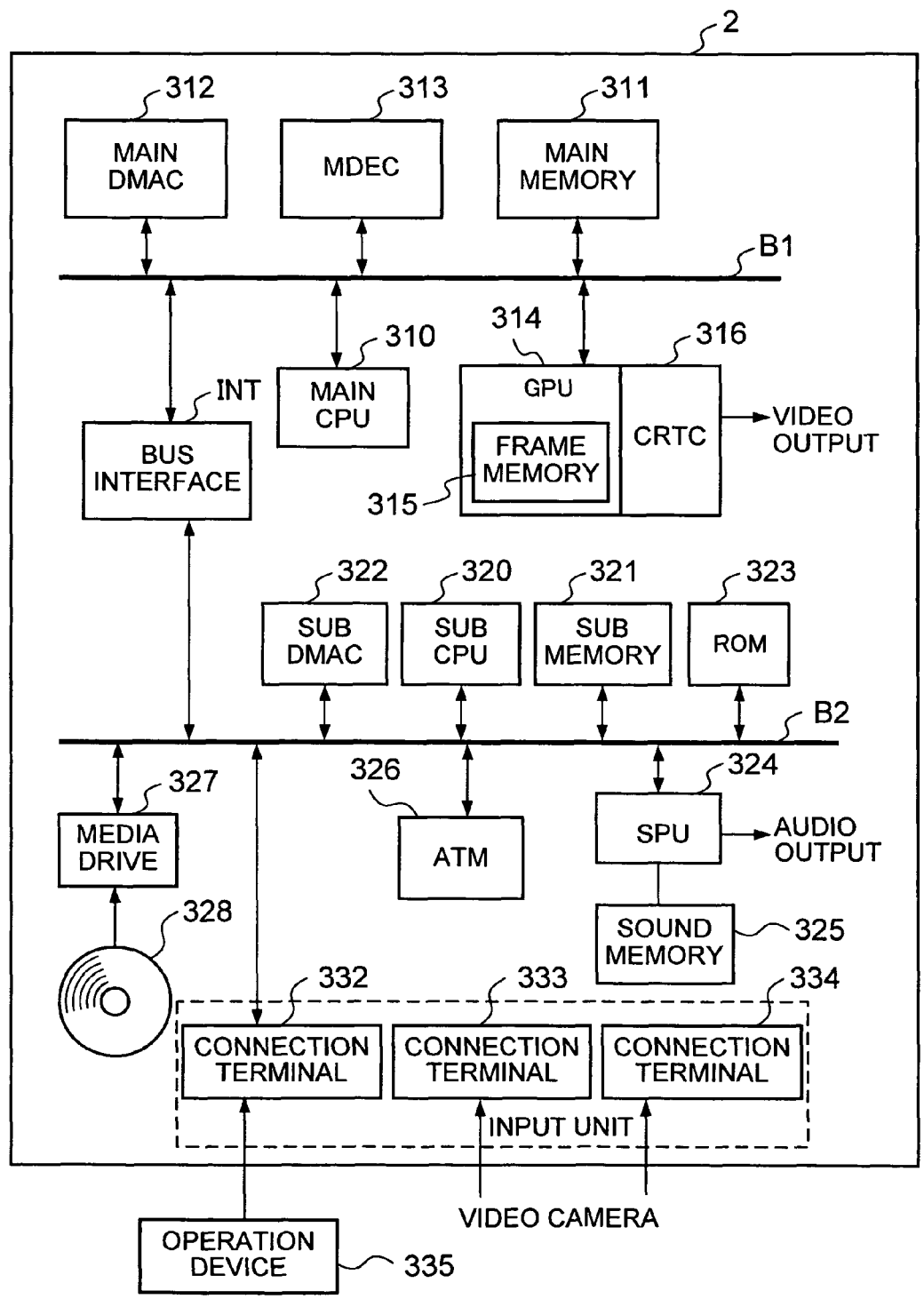
FIG. 2 is a block diagram showing a hardware configuration of the entertainment apparatus.

The entertainment apparatus 2 is implemented by an information processing device that forms required functions using a computer program. For example, as illustrated in the hardware configuration shown in FIG. 2, the entertainment apparatus 2 according to the present embodiment includes two buses, main bus B1 and sub bus B2, to which multiple semiconductor devices, each having a specific function, are connected. Those buses B1 and B2 are connected to each other or disconnected from each other via a bus interface INT.

The main bus B1 is connected to a main CPU 310 that is a primary semiconductor device, a main memory 311 made up of RAM, a main DMAC (Direct Memory Access Controller) 312, a MPEG (Moving Picture Experts Group) decoder (MDEC) 313, and a Graphic Processing Unit (hereinafter, referred to as "GPU") 314 that incorporates a frame memory 315 serving as a drawing memory. The GPU 314 is connected to a CRTC (CRT Controller) 316 that generates a video signal allowing data drawn in the frame memory 315 to be displayed on the display device 3.

The main CPU 310 reads a startup program via the bus interface INT from the ROM 323 on the sub bus B2 at the time of starting the computer, and executes the startup program to activate the operating system. In addition, the main CPU 310 controls the media drive 327 to read an application program and data from the media 328 mounted on this media drive 327, and stores the read-in application program and data in the main memory 311. Furthermore, the main CPU 310 applies geometric processing (coordinate value calculation processing) to represent shape, movement, and the like, of an object, on various data read from the media 328, as in, for example, three-dimensional object data (coordinate values of vertices (representative points) of a polygon, etc.), made up of multiple basic graphics (polygons). Then, a display list is generated, which contains polygon definition information by the geometric processing. The polygon definition information includes as contents; a shape and a drawing position of the polygon used, and specifications of components constituting the polygon, such as type, color tone, and texture.

The GPU 314 is a semiconductor device having the functions of storing drawing context (drawing data containing polygon components), carrying out rendering processing (drawing processing) by reading necessary drawing context according to the display list notified from the main CPU 310, and drawing polygons in the frame memory 315. The frame memory 315 may also be used as a texture memory. Therefore, a pixel image in the frame memory 315 can be pasted as texture to a polygon to be drawn.

The main DMAC 312 is a semiconductor device having the functions of carrying out DMA transfer control over each of the circuits connected to the main bus B1, and also carrying out DMA transfer control over each of the circuits connected to the sub bus B2 according to the condition of the bus interface INT. The MDEC 313 is a semiconductor device having the functions of operating in parallel with the main CPU 310, and extending data having been compressed according to MPEG (Moving Picture Experts Group) format, JPEG (Joint Photographic Experts Group) format, or the like.

The sub bus B2 is connected to sub CPU 320 made up of microprocessor and the like, sub memory 321 made of RAM, sub DMAC 322, ROM 323 that stores a control program such as operating system, a sound processing-use semiconductor device (SPU: Sound Processing Unit) 324 that reads sound data accumulated in the sound memory 325 and outputs the data as audio output, a communication controller (ATM) 326 that sends information to and receives information from an external device via a network, not illustrated, and a media drive 327 to mount media 328 such as a CD-ROM and a DVD-ROM, and an input unit 331.

The sub CPU 320 carries out various operations according to the control program stored in the ROM 323. The sub DMAC 322 is a semiconductor device that carries out control such as DMA transfer over each of the circuits connected to the sub bus B2, only in the state in which the bus interface INT disconnects the main bus B1 from the sub bus B2. The input unit 331 is provided with a connection terminal 332 through which an input signal from the operation device 335 is inputted, a connection terminal 333 through which an image signal from the video camera 1 is inputted, and a connection terminal 334 through which a sound signal is inputted from video camera 1, or the like. It is to be noted that in the present embodiment, an explanation will be given regarding images only, and explanations regarding sound will be omitted for convenience.

The computer as thus configured operates as the entertainment apparatus 2, when the main CPU 310, the sub CPU 320, and the GPU 314 read necessary computer programs from a recording medium such as the ROM 323 and the media 328, and executes those computer programs.

Figure 3:
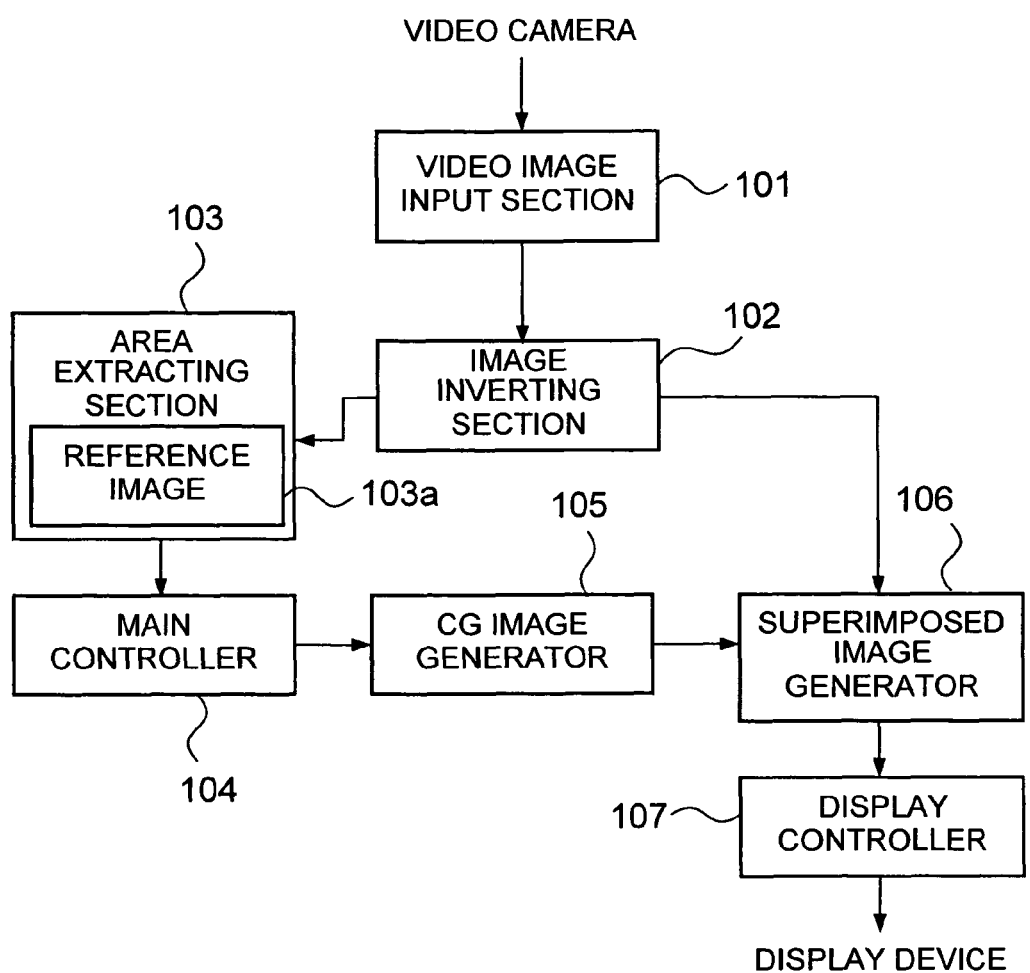
FIG. 3 is a block diagram showing a functional configuration of the entertainment apparatus.

FIG. 3 is a functional block diagram of this entertainment apparatus 2. In other words, a video image input section 101, an image inverting section 102, an area extracting section 103, a main controller 104, a CG generator 105, a superimposed image generator 106, and a display controller 107 are formed in the entertainment apparatus 2.

The video image input section 101 captures a video image taken by the video camera 1. The video image is a moving image, and the video image input section 101 continuously captures the images transferred from the video camera 1.

Figure 4A:
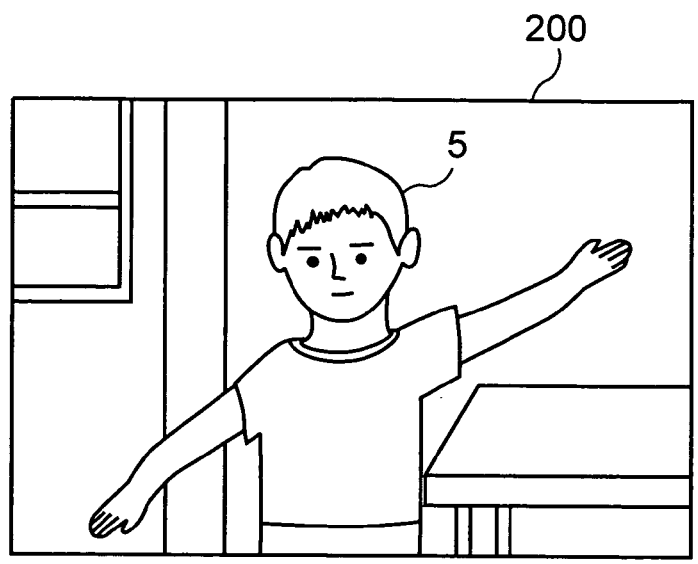
FIG. 4A is an illustration showing a mirrored image of a player.

The image inverting section 102 subjects the video image captured by the image input section 101 to mirroring, that is, right-left inversion process. FIG. 4A shows one example of a video image 200 of a player, which is obtained by taking an image of the player and subjected to mirroring. FIG. 4A includes the mirrored image 5 of the player. Subsequent processing is performed on this mirrored video image. If the mirroring of the video image is set to be performed on the video camera 1, it is possible to eliminate the image inverting section 102.

The area extracting section 103 carries out processing to extract an area where the image of the player is placed from the video image inverted by the image inverting section 102.

Figure 4B:
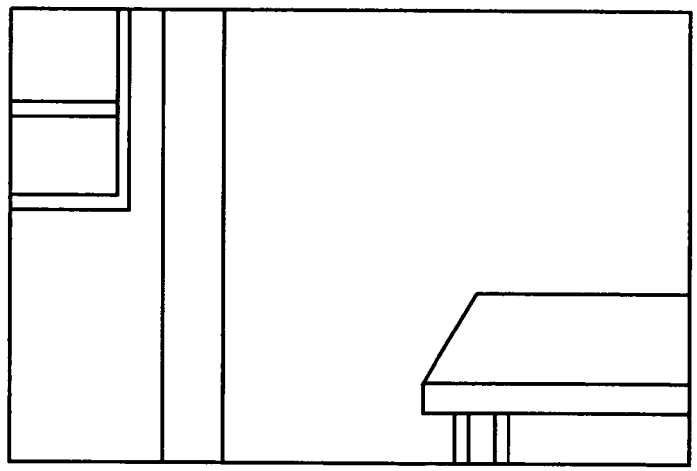
FIG. 4B is an illustration showing a reference image that does not contain the player image.
Figure 4C:
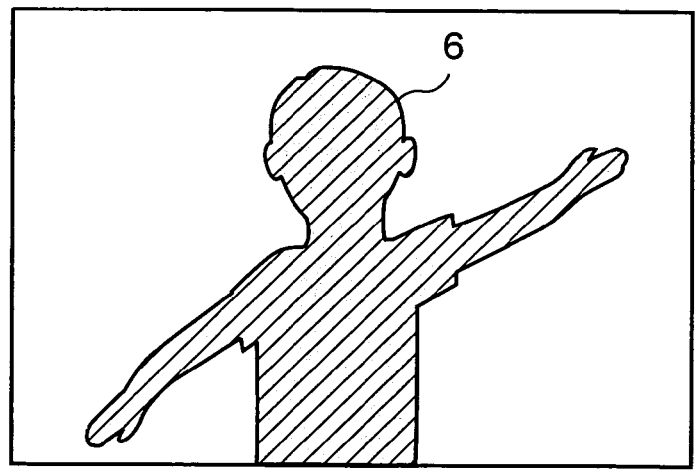
FIG. 4C is an illustration showing an area where the image of the player is placed.

In the present embodiment, the area extracting section 103 stores in advance, as a reference image 103a, one frame of the video image in which the image of the player is not placed. One example of the reference image 103a being associated with FIG. 4A is shown in FIG. 4B. On the basis of a difference between the reference image and the video image, an area where the image of the player 5 is placed is extracted. The area where the image of the player 5 is placed, being associated with FIG. 4A and FIG. 4B, is shown in FIG. 4C. FIG. 4C shows the area 6 that is obtained as a difference between FIG. 4A and FIG. 4B.

Therefore, in order to take an image in which the player is not contained, the entertainment apparatus 2 prompts the player to get out of the screen. In this condition, the area extracting section 103 extracts one frame of the video image that the image inverting section 102 has inverted, and then stores the extracted image as the reference image 103a.

Specifically, before starting play on the entertainment apparatus 2 according to a directive from the player, the entertainment apparatus 2 makes a display prompting the player to get out of the screen, and extracts one frame of the video image after a lapse of a predetermined period of time. On this occasion, it is desirable that a countdown is displayed so as to allow the player to be aware of the time when the image is taken.

It is to be noted that a method to extract, from the video image, the area where the image of the player is placed is not limited to the above procedure. For example, it is also possible to detect a difference between a before-frame and an after-frame based on the motion of the player, or to extract an area where the image of the player is placed in the video image by the use of pattern recognition or the like.

The processing by the area extracting section 103, to extract the area where the image of the player is placed, is performed continuously in real time. That is, along with the motion of the player, the area shown in FIG. 4C varies sequentially.

The main controller 104 conducts overall control of the entertainment system. For example, when the entertainment apparatus 2 is executing a game program, the main controller 104 decides a story for the game according to the program. In addition, when the main controller 104 decides the story, it may refer to a result of determination of a determining section 103. Details of this procedure will be explained later. In other words, the entertainment apparatus 2 executes a program recorded in a recording medium such as a DVD-ROM or a CD-ROM, thereby configuring the functional block as shown in FIG. 3, and executes various processes of the present embodiment.

Figure 5:
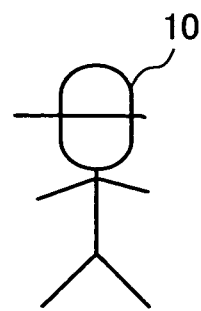
FIG. 5 illustrates a computer image of a character.

The CG generator 105 generates various computer images along with the game story line according to a directive from the main controller 104. In the present embodiment, the CG generator 105 displays, on the screen, a character 10 as shown in FIG. 5 according to a predetermined rule. The character 10 moves in the screen under control of the main controller 104. At this time, it is desirable that the CG generator 105 changes the mode of how the character 10 is displayed, such as, for example, normal walking, climbing, or falling. In the present example, the character 10 is designed to represent a human being who is wearing a hat, but it is not limited to this example. The character may be an animal, a vehicle, or the like.

In addition, the CG generator 105 generates a computer image of an entrance that is a starting point for the character 10 and a computer image of an exit that is a goal for the character 10. The entrance and the exit may be treated as fixed images. Furthermore, there may be more than one entrance and exit. In the present embodiment, two entrances are provided on the right edge of the screen and two exits are provided on the left edge of the screen. The two entrances are separately arranged one above the other, respectively, and the two exits are separately arranged one above the other, respectively, as well.

Figure 6:
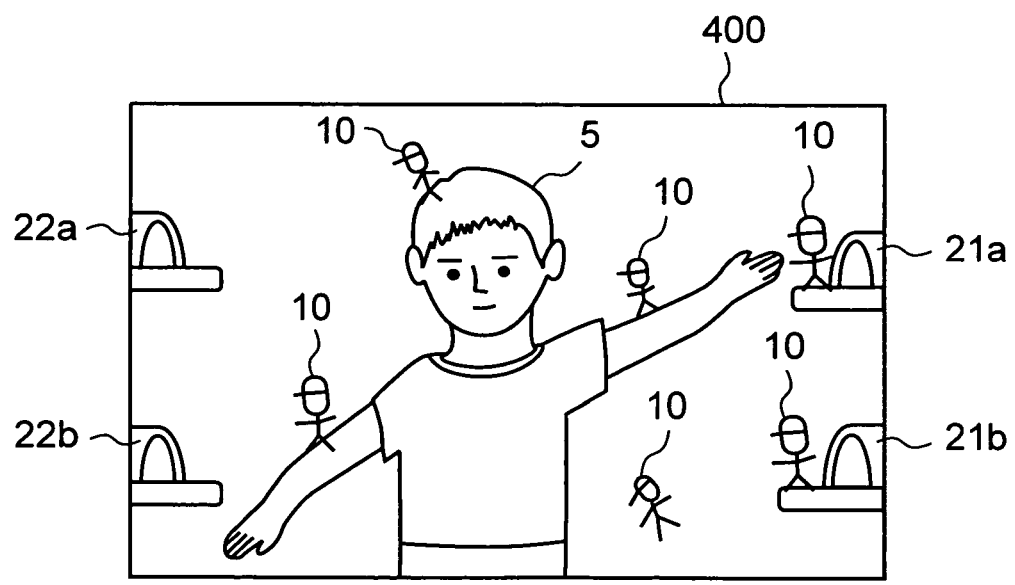
FIG. 6 illustrates an example of a superimposed image.

The superimposed image generator 106 superimposes the video image having been subjected to mirroring by the image inverting section 102, and the computer image generated by the CG generator 105. For example, the superimposed image generator 106 superimposes the video image 200 as shown in FIG. 4A, the character 10 as shown in FIG. 5, and the fixed images of the entrance 21 and the exit 22, whereby the superimposed image 400 as shown in FIG. 6 is generated. For ease of understanding, in FIG. 6, the background to the rear of the player 5 is omitted in the video image that has been subjected to mirroring.

The area where the image of the player is placed in FIG. 6 corresponds to the area 6 extracted by the area extracting section 103 (see FIG. 4C). In other words, the main controller 104 is able to figure out the area where the image of the player 5 is placed in real time.

The display controller 107 displays on the display device 3 the superimposed image generated by the superimposed image generator 106. In other words, the player is allowed to conduct various operations in the entertainment system, while the player is viewing the superimposed image obtained by superimposing the mirrored moving image of himself or herself and the computer image.

Next, control of movement of the character 10, which is carried out by the main controller 104, will be explained. In the present embodiment, it is assumed that the character 10 moves along the area of the player extracted by the area extracting section 103. Specifically, the character 10 moves assuming the area of the player as a route.

In other words, as shown in FIG. 6, the characters 10 appearing from the entrances 21a and 21b assume the area of the player 5 as a route, and move from the right side to the left side toward the exits 22a and 22b. In this situation, if a route does not exist, the character 10 may fall. Hereinafter, an explanation will be given assuming that the horizontal direction of the screen is the X-axis and the vertical direction of the screen is the Y-axis.

Here, since the main controller 104 is capable of recognizing the area of the player in real time, the main controller 104 controls the action of the character 10 as appropriate in response to a route change due to the motion of the player. As thus controlled, the character 10 looks as if it is moving along with the player.

On the other hand, by the player changing his or her own posture on the screen to define the route of the character 10, a destination of each of the characters 10 is controlled in real time. For example, by getting onto the arm of the character 10 who has appeared from the entrance 21a, it is possible to make a display in which the character moves while passing over the arm. If nothing is done about the character 10 who has appeared from the entrance 21b, the character 10 ends up falling.

The main controller 104 may be able to further improve the game quality in the entertainment apparatus 2 by setting the exit 22 as a destination with respect to each character 10 according to the game scenario, making various types of characters appear, giving a bonus point in response to the player's control, and the like.

Figure 7A:
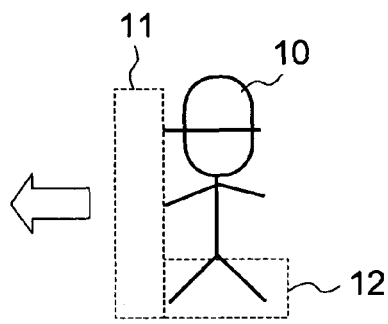
FIG. 7A is an illustration showing a moving direction and detection areas of the character.

Next, specific examples of controlling the movement of the character 10 in the present embodiment will be explained. As shown in FIG. 7A, the character 10 basically proceeds in one direction, from right to left, in the horizontal direction. On the other hand, as for the vertical direction, if there is a route having a wall in front, the character 10 is controlled to proceed in the direction obliquely upward. If there is no route below, the character is controlled so as to go down. It is to be noted that if the character 10 falls on another route in midcourse while going down, the character 10 is controlled to move horizontally again. This may correspond to a motion of the player picking up the character 10 that is falling, a movement of the character 10 that is slipping down a slope, or the like.

Since the character 10 is required to be moved in real time, together with the player's area extraction process and the like, it is desirable that the control of the movement of the character 10 is performed in a simple process.

Therefore, in the present embodiment, conditions of the route in the foreside and in the downside of the character 10 are determined, thereby defining a subsequent moving direction. In other words, as shown in FIG. 7A, there are provided a forward detection area 11 in the foreside of the moving direction, and a downward detection area 12 in the downside. It is desirable that some parts of both the detection areas 11 and 12 may overlap the area where the character 10 occupies.

These detection areas 11 and 12 are areas to detect to what extent a part accepted as a route is contained in those areas. For example, each detection result may be represented as a ratio, such as 40%. This result indicates that a part accepted as a route occupies 40% of the detection area. This detection result can be obtained, for example, by dividing the detection areas 11 and 12 into a matrix with a predetermined size, determining whether or not each element of the matrix fits into the route, and then calculating a ratio of a part of the matrix corresponding to the route.

Figure 7B:
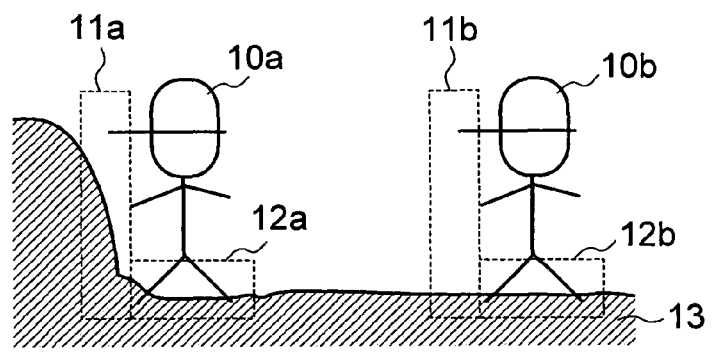
FIG. 7B is an illustration showing an example of how the character proceeds.

FIG. 7B indicates an example in which the character 10a and the character 10b are passing along the route 13. At this time, the character 10a is detected as occupying around 50% of both the forward detection area 11a and the downward detection area 12a The character 10b is detected as occupying around 5% of the forward detection area 11b, and 50% of the downward detection area 12b.

On the basis of the detection results regarding the route in the detection areas 11 and 12, the main controller 104 controls the movement of the character 10 according to the flow diagram as shown in FIG. 8. The main controller 104 allows multiple characters 10 to appear in the screen, and each of the characters 10 to move continuously and independently in real time according to the motion of the player, by repeatedly executing the process of the flow diagram as shown in FIG. 8 for each character 10.

Variable J is employed in the flow diagram above. In the case where there is no route below, that is, the player does not give a route to the character 10, this variable J is used so that the character 10 starts falling after a lapse of a certain period of time, without the character 10 falling immediately.

The main controller 104 allows the character 10 to appear from any of the starting points (entrances 21), and to conduct control as described below. It is to be noted that making the character 10 walk or run, according to the game scenario is also possible.

Firstly, the variable J is initialized to zero (S101).

Then, it is determined whether or not the current position is at a goal (exit 22) (S102). As a result of the determination, if the character reaches the goal (S102: Y), a goal process is performed according to the game scenario (S103). Here, in the goal process, for example, the character 10 is erased from the screen, and the player can acquire a point being added according to a predetermined rule.

On the other hand, if the character 10 has not reached the goal yet (S102: N), it is determined whether or not there exists a route in front, on the basis of the detection result of the forward detection area 11 (S104). It is possible to determine whether or not there exists a route in front, for example, by the ratio of the route occupying the forward detection area 11. By way of example, if the ratio is equal to or more than a predetermined value, for instance, 30%, it is possible to determine that a route exists in front.

As a result, if it is determined that a route exists in front (S104: Y), this route is assumed as an upward slope, the variable J is reset (S105), and climbing process is carried out (S106).

Figure 9A:
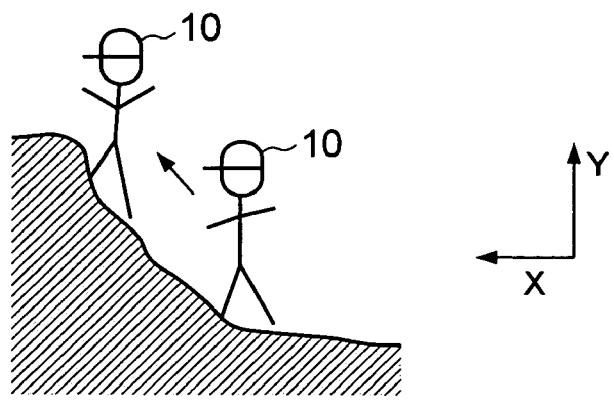
FIG. 9A illustrates movement of the character.

As shown in FIG. 9A, the climbing process allows the character 10 to move mostly in the upper direction with a larger Y-axis shift amount, and to move in the left direction with an X-axis shift amount being smaller than ordinary horizontal movement. The shift amount is set to a value suitable for the game scenario. Then, the process returns to step S102, and the subsequent process is repeated.

If it is determined that a route does not exist in front (S104: N), it is determined whether or not there exists a route below, on the basis of the detection result of the downward detection area 12 (S107). It is possible to determine whether or not there exists a route below, for example, by the ratio of the route occupying the downward detection area 12. As a way of example, if the ratio is equal to or more than a predetermined value, for instance, 10%, it is determined that a route exists in front.

Consequently, if it is determined that a route exists below (S107: Y), this route is assumed as being horizontal, and the variable J is reset (S108).

Figure 9B:
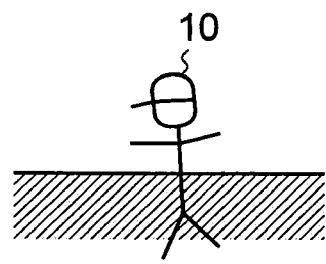
FIG. 9B illustrates a character buried in a route.
Figure 9C:
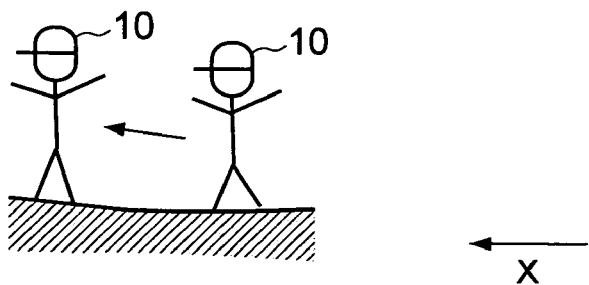
FIG. 9C illustrates movement of the character.
Figure 9D:
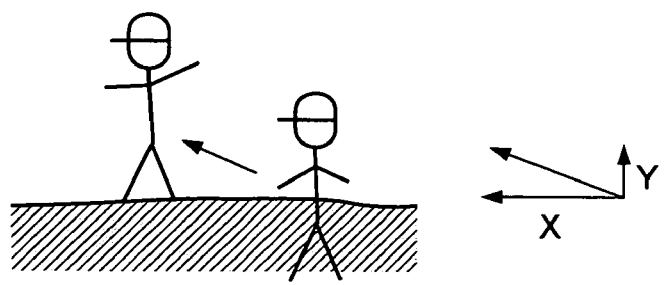
FIG. 9D illustrates another movement of the character.

It is further determined whether or not the ratio of the route occupying the downward detection area 12 is equal to or more than a predetermined value, for instance, 90% (S109). This is determined in order to know the condition of the character 10, such as being buried in the ground as shown in FIG. 9B. In other words, if the ratio of the route occupying the downward detection area 12 is over a predetermined reference value, it is determined that the character is in a condition such as being buried in the route.

As a result, if the ratio of the route occupying the downward detection area 12 is less than the predetermined ratio (S109: N), the character 10 is moved in the left direction with respect to the X-axis, as a normal horizontal movement (S110). The shift amount is set to a value suitable for the game scenario. For example, if the character is running, the shift amount is set to be larger than the case where the character is walking. In the situation above, it is desirable to display the character 10 in such a manner as "walking", "skipping", and the like, according to the game scenario.

On the other hand, if the ratio of the route occupying the downward detection area 12 is equal to or more than a predetermined ratio (S109: Y), the character 10 is moved somewhat upwardly with respect to Y-axis, in addition to the above horizontal movement (S111). The character 10 is moved in this manner in order to avoid appearing to move while being buried in the route.

If it is determined that a route does not exist below (S107: N), 1 is added to J (S112). Then, it is determined whether or not J reaches a predetermined value (S113). That is, it is determined whether or not the condition that the route does not exist below, is still continuing.

As a result of the determination, if the value of J does not reach the predetermined value (S113: Y), the processing returns to step S102, and subsequent processing is repeated.

On the other hand, when J reaches the predetermined value (S113: N), a falling process is performed (S114). In the falling process, the character 10 is moved downwardly at a predetermined speed. At this time, it is desirable to display a falling motion.

It is to be noted that processing as below is performed for the character 10 after it has fallen. That is, if the character 10 goes out of the screen after falling, the character 10 is eliminated from a control target. In addition, detection of the downside by the downward detection area is continued during the falling motion (S115), and if a route is detected on the downside (S115: Y), the process returns to step S108 and horizontal movement is restarted. For example, since the downside is not detected on the left end of the player's head, the character 10 starts falling. Then, upon falling on the shoulder part, a route on the downside is detected, and horizontal movement is restarted. Along the downward slope, falling and horizontal movement are repeated alternately in a short cycle, whereby the character 10 goes down stepwise.

It is to be noted that specific moving rules of the character 10 are not limited to the above example, and various methods can be employed. In addition, the route of the character 10 is not limited to the area where the image of the player is placed. For example, it is also possible to move the character 10 along an item such as a stick, operated by the player, that is regarded as the route.

What is claimed is:

1. An information processing system comprising:
   an area extraction means that extracts an area occupied by a player, from a mirrored moving image based on a reference image;
   a control means that generates a computer image containing a game character; and
   a display control means that allows a display device to display a superimposed moving image obtained by superimposing the mirrored moving image and the computer image; wherein
   the control means moves the game character along the area occupied by the player in the superimposed moving image,
   the control means makes the game character fall, if there is no area occupied by the player below the game character, and
   the control means moves the game character obliquely upward in the moving direction of the game character, if there exists an area occupied by the player in front of the game character.

2. The information processing system according to claim 1, further comprising:
   a player moving image accepting means that accepts input of a player moving image obtained by taking images of the player by an image pickup device; and
   a mirrored moving image processing means that subjects the player moving image to mirroring.

3. The information processing system according to claim 1, wherein
   the display control means allows the display device to display an image prompting the player to get out of an image frame of the image pickup device, so as to obtain the reference image.

4. The information processing system according to claim 1, wherein
   the control means allows the game character to appear from one or a plurality of starting points provided on one side of a screen, and to move toward one or a plurality of goals provided on the other side of the screen.

5. The information processing system according to claim 4, wherein
   the control means determines whether or not there exists an area occupied by the player in front of the game character that is moving in a forward and below the game character.

6. A non-transitory recording medium that records a program which can execute a game to move game characters by an information processing device that is connected to an image pickup device and a display device,
   the program causing the information processing device to perform functions comprising:
   an area extraction means that extracts an area occupied by a player, from a mirrored moving image based on a reference image;
   a control means that generates a computer image containing a game character; and
   a display control means that allows the display device to display a superimposed moving image obtained by superimposing the mirrored moving image and the computer image; wherein
   the control means moves the game character along the area occupied by the player in the superimposed moving image,
   the control means makes the game character fall, if there is no area occupied by the player below the game character, and
   the control means moves the game character obliquely upward in the moving direction of the game character, if there exists an area occupied by the player in front of the game character.

7. The non-transitory recording medium according to claim 6, wherein
   the program causes the information processing device to perform functions comprising:
   a player moving image accepting means that accepts input of a player moving image obtained by taking images of the player by the image pickup device; and
   a mirrored moving image processing means that subjects the player moving image to mirroring.

8. The non-transitory recording medium according to claim 6, wherein
   the display control means allows the display device to display an image prompting the player to get out of an image frame of the image pickup device, so as to obtain the reference image.

9. The non-transitory recording medium according to claim 6, wherein
   the control means allows the game character to appear from one or a plurality of starting points provided on one side of a screen, and to move toward one or a plurality of goals provided on the other side of the screen.

10. The non-transitory recording medium according to claim 9, wherein
the control means determines whether or not an area occupied by the player exists in front of the game character that is moving in a forward and below the game character.

11. A game character movement control method in an information processing device that is connected to an image pickup device and a display device, comprising:
an area extraction process that extracts an area occupied by a player, from a mirrored moving image based on a reference image;
a control process that generates a computer image containing a game character; and
a moving control process that allows the display device to display a superimposed moving image obtained by superimposing the mirrored moving image and the computer image, and moves the game character, regarding an area occupied by the player in the superimposed moving image as a route, wherein
the control process makes the game character fall, if there is no area occupied by the player below the game character, and moves the game character obliquely upward in the moving direction of the game character, if there exists an area occupied by the player in front of the game character.

12. An information processing system comprising:
an area extraction means that extracts an area occupied by a player, from a mirrored moving image based on a reference image;
a control means that generates a computer image containing a game character; and
a display control means that allows a display device to display a superimposed moving image obtained by superimposing the mirrored moving image and the computer image; wherein
the control means moves the game character along the area occupied by the player in the superimposed moving image, and further comprising detection means to detect an overlap area between a detection area provided for the game character and the area occupied by the player, wherein
when the detection means detects an area where a ratio of overlap is greater than a predetermined value, the control means determines that there is a route in the direction of the overlap area and moves the game character along the route.

13. The information processing system according to claim 12, wherein at least more than two detection areas are provided for the game character.

14. A non-transitory recording medium that records a program which can execute a game to move game characters by an information processing device that is connected to an image pickup device and a display device,
the program causing the information processing device to perform functions comprising:
an area extraction means that extracts an area occupied by a player, from a mirrored moving image based on a reference image;
a control means that generates a computer image containing a game character; and
a display control means that allows the display device to display a superimposed moving image obtained by superimposing the mirrored moving image and the computer image; wherein
the control means moves the game character along the area occupied by the player in the superimposed moving image, and further comprising detection means to detect an overlap area between a detection area provided for the game character and an area occupied by the player, wherein
when the detection means detects an area where a ratio of overlap is greater than a predetermined value, the control means determines that there is a route in the direction of the overlap area and moves the game character along the route.

15. The non-transitory recording medium according to claim 14, wherein at least more than two detection areas are provided for the game character.

\* \* \* \* \*